United States Patent Office 3,125,202
Patented Mar. 17, 1964

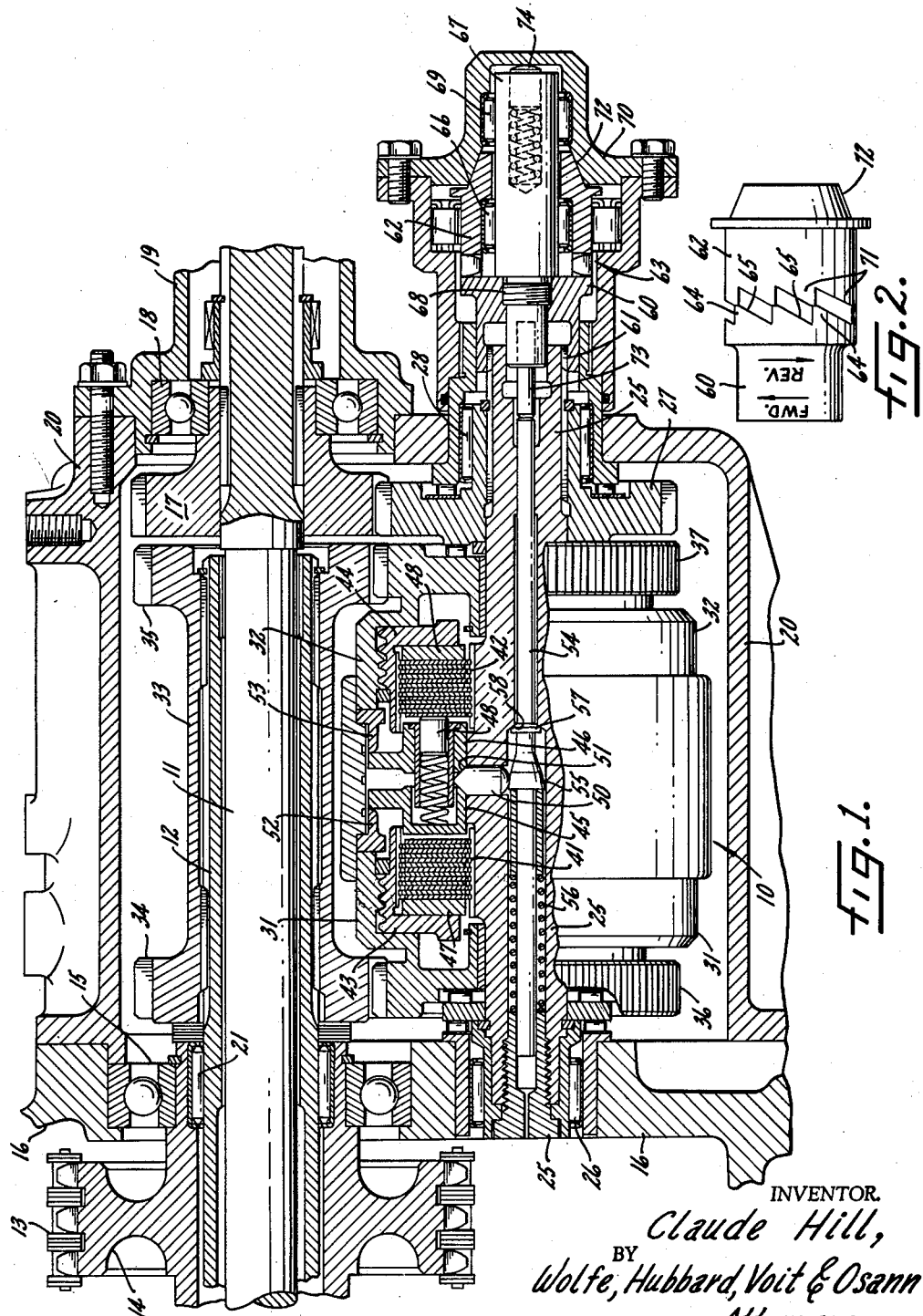

3,125,202
CLUTCH FOR DIFFERENTIAL CONTROL
Claude Hill, Kenilworth, England, assignor to Harry
Ferguson Research Limited, Gloucestershire, England,
a British company
Filed Feb. 6, 1962, Ser. No. 171,449
Claims priority, application Great Britain Feb. 9, 1961
5 Claims. (Cl. 192—47)

This invention relates generally to vehicle drive gearing and concerns, more particularly, a control for differential gearing intended primarily for transmitting power to the ground wheels of four wheel drive vehicles.

Limited action, or "controlled," differential gears find particular utility in distributing power from the engine to both the front and rear axles of a four wheel drive vehicle. A vehicle driving system of this type is shown in some detail in my United States Patent No. 2,796,941, issued June 23, 1957. As described therein, a controlled differential gear distributing power to the front and rear axles of a vehicle gives the traction efficiency of full time, four wheel drive without tire scrub caused by cornering or variations in wheel size, while the "control" of the controlled differential avoids traction loss, should one or two wheels slip or spin on ice or mud, and loss of braking force upon skidding and "locking up" of one of the wheels when the brakes are applied.

To provide such control of a differential, a dual one-way clutch assembly of the type shown in my copending United States application, Serial No. 21,467, filed April 11, 1960, finds particular utility. The basic aim of the present invention is to provide an improved clutch of this type. A device of this character positively limits rotational speed variations between two rotating members. As disclosed in the above identified application, this result is achieved by having one of the members rotate a pair of overrunning clutches at dissimilar speeds and causing the clutches to grip the other member should its rotational speed tend to exceed or fall below the limits set by the dissimilar speeds of the clutches.

One problem encountered in such devices is the fact that reverse rotation of the parts causes the dual clutch to lock up and, hence, for normal automotive use, provision must be made for disabling the clutch mechanism when the vehicle is to be operated in reverse. This aspect of the control is, of course, discussed in the application referred to above.

Accordingly, it is an object of the invention to provide an improved clutch assembly for differential gearing control which embodies a simple and effective mechanism for disabling the mechanism when reverse drive is initiated.

Moreover, it is an object to provide a clutch assembly of the above type which operates automatically by quickly disabling the clutch mechanism as soon as reverse drive begins. A collateral object is to provide a clutch of this character which, upon resuming direct drive from reverse operation, automatically is restored for effectively limiting the rotational speed variations between two rotatable members.

It is also an object to provide a clutch assembly as described above which embodies a reliable, completely mechanical disabling mechanism.

Other objects and advantages of the invention will become apparent upon reading the following detailed description and upon reference to the drawing, in which:

FIGURE 1 is a section of a fragment of a drive gearing arrangement which utilizes a clutch assembly embodying the present invention; and FIG. 2 is a slightly enlarged side elevation of a pair of parts illustrated in section in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawing, there is shown a clutch assembly 10 constructed in accordance with the invention and arranged to limit rotational speed variations between a shaft 11 and a sleeve 12 surrounding the shaft. In a typical embodiment, the shaft 11 serves as a drive shaft for one axle of a vehicle and is coupled to the sun gear output element of a differential gear, not shown, while the sleeve 12 is coupled to the carrier element of the differential gear. Thus, the shaft 11 and sleeve 12 would normally rotate in unison, with there being relative rotation between these parts, in the same direction, whenever differential action occurs in the differential gear. This, of course, will be apparent to those familiar with this art.

Again referring to a typical environment, the differential gearing is driven from the vehicle engine by a chain 13 which is trained about a sprocket 14. The sprocket 14 is preferably coupled to the differential carrier, the input element of the differential gear through reversing gearing so as to provide forward and reverse drive for the shaft 11 and the sleeve 12 and, hence, for the vehicle in which the transmission is embodied. This general environment and arrangement of parts is discussed in some detail in the application identified above.

The sprocket 14 is journalled in a roller bearing 15 fitted in a transmission wall 16. The shaft 11 is splined, at the right in FIG. 1, in a gear 17 which is journalled in a roller bearing 18. The bearing 18 is seated in the end of a drive shaft tube 19 that is bolted to a housing 20 mounted on the transmission wall 16 so as to enclose the clutch assembly 10 and related parts.

The sleeve 12 is rotatably supported by a needle bearing 21 mounted between the sleeve and the sprocket 14. The sleeve 12 extends past the sprocket 14 to a point adjacent the clutch assembly 10, and the clutch assembly includes a layshaft 25 journalled parallel to the shaft 11 and the sleeve 12. One end of the layshaft 25 is journalled in a bearing 26 fitted in the wall 16, and the opposite end of the layshaft is splined within a gear 27 that is rotatably supported in a bearing 28 which is mounted in the housing 20.

For setting up rotational speed limits, the shaft 11 is coupled to the layshaft 25 through the gears 17 and 27 which are in meshing engagement, and the sleeve 12 is coupled to a pair of cup-shaped housings 31 and 32 arranged in opposed adjacent relation. Preferably, the sleeve 12 carries a unitary base 33 formed with gears 34 and 35 which mesh with gears 36 and 37 formed on the housings 31, 32, respectively.

The gears pairs 17 and 27, 34 and 36, and 35 and 37 all establish slightly different driving ratios so that the housing 31 rotates in the same direction as the layshaft 25 but at a slightly higher speed while the housing 32 rotates in the same direction as the layshaft 25 but at a slightly lower speed. The speed differences between the housing 31 and the layshaft, and the housing 32 and the layshaft, are the relative speed limitations imposed by the clutch assembly 10 on the shaft 11 and the sleeve 12. It will thus be apparent that these limitations can be varied by selecting appropriate driving ratios for the several gear pairs connecting the shaft 11 and the layshaft 25, and connecting the sleeve 12 to the two housings 31, 32.

To lock the shaft 11 and the sleeve 12 together as the shaft speed moves up and down to the predetermined speed limits, sets of annular friction plates 41 and 42 are disposed in the housings 31, 32, respectively. The several plates in each of the sets 41, 42 are alternately keyed to the surrounding housing, through nut members 43 and 44, respectively, and to the layshaft 25 so that when the friction plates are pressed together, they frictionally clutch their respective housings to the layshaft 25. It will be seen that locking of either one of the housings 31, 32 to the layshaft 25 also results in locking the shaft 11 and the surrounding sleeve 12 together for rotation at the relative speeds imposed by the pairs of gears 34, 36 or 35, 37. This, of course, halts further differential action in the differential gear with which the shaft 11 and the sleeve 12 are preferably associated.

For engaging the sets of friction plates 41, 42, the plates are sandwiched between abutment members 45 and 46 and plates 47 and 48 carried by the respective annular clutch operating nut members 43, 44. Movement of the nut members 43, 44 toward the adjacent sets of friction plates 41, 42 causes the plates 47, 48 to be pressed against the abutment members 45, 46 so that the plates clutch together and lock the surrounding housings to the layshaft 25.

The clutch operating member 43 acts on the adjacent set of friction plates 41 only when the layshaft speed exceeds the speed of rotation of the housing 31, and the clutch operating member 44 acts on the adjacent set of friction plates 42 only when the layshaft speed becomes less than the speed of rotation of the housing 32. To accomplish this result, the members 43, 44 have peripheral threaded portions threadably engaging helical threads formed on the respective housings 31 and 32. In addition, a plurality of spring biased plungers 48, of which only one is shown, are disposed between the abutment members 45, 46 so as to bear on both the plates 42 and the plates 41. The annularly disposed plungers 48 act alternately on the plates 41, 42 so that plungers engage each set of plates.

The biased pins 48 establish a slight frictional contact between the adjacent plates 41, 42 so that these sets of plates exert a frictional drag on the nut members 43, 44. The drag action of the slightly engaged friction discs 41, 42 tends to cause the nut members 43, 44 to rotate in unison with the layshaft 25. Because the housings 31, 32 with which the nut members 43, 44 are threadably engaged rotate at speeds that differ from the speed of the layshaft 25, the nut members tend to rotate relative to the helical threads formed on the interior peripheral portion of the housings 31, 32.

In the illustrated construction, the helical threads formed on the housings 31, 32 are of the same hand so that rotation of the nut member 43, as it is dragged by the layshaft 25 at a rotational speed that is lower than the rotational speed of the housing 31, tends to run the nut member 43 away from the set of friction plates 41 and toward the left in FIG. 1. Conversely, rotation of the nut member 44, as it is dragged by the layshaft 25 at a speed slightly higher than the speed of rotation of the housing 32, tends to run the nut member 44 toward the right in FIG. 1 and away from the set of friction plates 42. The nut members 43, 44 abut the ends of their respective housings 31, 32 so as to establish limit positions for the threadable movement of the nut members away from their adjacent sets of friction plates.

When the speed of the layshaft 25 increases so that it rotates more rapidly than the housing 31, the drag on the friction plates 41 tends to relatively speed up the nut member 43 so that its threadable engagement with the housing 31 runs the nut member toward the right in FIG. 1, squeezing the set of friction plates 41 against the abutment member 45 and clutching the layshaft 25 to the housing 31. As soon as this squeezing action begins, the speeding up force acting on the nut member 43 is substantially increased so that further clutching pressure is exerted by the nut member 43. In this way, the speed of the shaft 11 can only increase relative to the rotational speed of surrounding sleeve 12 to the point where the layshaft 25 is rotated at the same speed as the housing 31. Any further speed differential causes the nut member 43 to be run toward the right in this figure with the result that the layshaft 25 and the housing 31 are locked together and the shaft 11 is rotatably coupled to the sleeve 12 through the pairs of gears 34, 36 and 17, 27.

Similarly, when the rotational speed of the layshaft 25 drops below the rotational speed of the housing 32, the slight drag exerted through the friction plates 42 on the nut member 44 tends to retard the nut member to cause it to rotate at a speed lower than the speed of the housing 32 with the result that the nut member is run toward the left in FIG. 1 thereby squeezing the set of friction plates 42 and clutching the layshaft to the housing. As observed above, this locks the shaft 11 to the sleeve 12 and ceases the differential action in the differential gear with which these elements are associated. In this way, the speed of the shaft 11 cannot decrease relative to the rotational speed of the sleeve 12 beyond the point where the rotational speed of the layshaft 25 becomes less than the speed of the housing 32. When this limit is reached, the friction discs 44 are effective to lock the shaft 11 and the sleeve 12 together through the pairs of gears 35, 37 and 17, 27.

It will be appreciated, of course, that operation of the dual, one-way clutch asesmbly 10 depends upon the abutment members 45, 46 resisting the clutch actuating forces developed in the two one-way clutches by the clutch operating nut members 43, 44 as they are run against their associated sets of friction plates.

As is discussed in detail in the application identified above, the limits within which differential action is maintained by the clutch assembly 10 is sufficient to permit the vehicle being driven to turn as sharply as its steering gear permits and to accommodate slight wheel diameter variations that might be caused by differences in tire inflation or uneven loading of the vehicle. In other words, the range established by the assembly 10 provides sufficient differences in relative rotation between the shaft 11 and the sleeve 12 to accommodate all normal reasons why slight differential action should take place in a differential distributing power to the front and rear axles of a four wheel drive vehicle.

When an abnormal condition is encountered, such as locking up of a wheel brake when the associated wheel loses traction on ice or in mud, it will be understood that the differential distributing power to the front and rear wheels tends to operate with a high differential action. However, because of the control exerted by the clutch assembly 10, the differential action is ended at predetermined limits and power is maintained to both the front and rear wheels of the vehicle.

In keeping with the invention, the abutment members 45, 46 are held in position to resist the clutch actuating forces exerted on the plates 41, 42 by a plurality of latch wedges 50 of which only one is shown. The wedges 50 are positioned in apertures spaced annularly about the layshaft 25 and protrude radially from the periphery of the layshaft so that a conical point 51 on each of the wedges 50 engages the abutment members 45, 46 to wedge them apart against stop rings 52 and 53 carried adjacent the housings 31, 32 respectively.

The wedge 50 is held in latching position by a plunger 54 having an annular shoulder 55 which engages the latch wedges 50 and urges them outwardly so as to cam the abutment members 45, 46 apart. A compressed helical spring 56 urges the plunger 54 toward the right in FIG. 1 to a rest position for the plunger established by a collar 57 on the plunger being seated against a shoulder 58 formed in the bore in which the plunger slides. With the plunger 54 held in its rest position, the shoulder 55 urges the latch wedges 50 outwardly so as to hold the abutment members 45, 46 in position to resist the clutch actuating forces.

In accordance with the invention, a helical cam 60 is splined at 61 to one end of the layshaft 25 and cooperates with a rotatable abutment element 62 which is anchored by a one-way clutch 63 against rotation when the layshaft 25 is driven in a reverse direction. The cam 60 is coupled to the plunger 54 so that reverse rotation of the layshaft causes the cam 60 to be shifted axially to release the latch wedges 50 and, thus, disable the one-way clutches embodying the plates 41, 42.

The cam 60 is annular and preferably provided with a plurality of annularly disposed teeth 64 having similarly alined, substantially helical cam faces 65. The abutment element 62 is also annular and is rotatably mounted on a bearing 66 fitted on a shaft 67 which is secured to the cam 60 at 68 so that the shaft 67 forms a rotatable extension of the layshaft 25. At its outer end, the shaft 67 is journalled in a bearing 69 seated within a subhousing 70 defining a protuberance on the housing 20. The abutment element 62 is formed with a plurality of annularly spaced teeth 71 which are complimentarily formed with respect to the cam teeth 64 and are adapted to interfit therewith.

As can be best seen in FIG. 2, rotation of the cam 60 in the reverse direction causes the cam surfaces 65 on the teeth 64 to ride up on the abutment element teeth 71 so as to shift the cam 60 axially.

A shoulder 72 on the abutment element 62 seats against the end of the subhousing 70 so as to resist axial movement of the element 62 and thus resist the camming force which shifts the cam 60 axially. Forward rotation of the cam 60 results in interlocking of the teeth 64, 71.

The one-way clutch 63 is oriented so as to lock the abutment element 62 against rotation relative to the subhousing 70 when there is a tendency to move the element in the reverse direction. The teeth 71, thus, become stationary and allow the camming action to take place which results in axial shifting movement of the cam 60. Upon forward movement of the cam 60, with the teeth 64, 71 interfitted so as to lock the cam and the abutment element 62 together, the one-way clutch 63 free-wheels and allows the element 62 to be carried rotatably within the housing 70.

For coupling the cam 60 to the latch wedges 50, a pin 73 is piloted in the end of the shaft 67 so as to be alined with the plunger 54. A spring biased pin 74 disposed in the opposite end of the shaft 67 holds the pin 73 snugly against the plunger 54 so as to avoid looseness of the parts. It will be understood, of course, that the force exerted by the helical spring 56 on the plunger 54 exceeds the force exerted by the pin 74 so that the plunger 54 is held in its normal wedge locking position.

The operation of the control will be readily apparent to those skilled in the art. The clutch assembly 10, with its dual one-way clutches including the friction plates 41, 42, are effective to limit the speed variations between the shaft 11 and the sleeve 12 when these parts are rotated in their forward directions. The term "forward" has, of course, been taken to indicate that direction in which these parts would rotate when connected to a vehicle differential transferring power to move the vehicle in a forward direction. With the layshaft 25 rotating in its forward direction, the cam teeth 64 are interlocked with the abutment element teeth 71 so that the cam and the abutment element 62 rotate in unison within the overrunning one-way clutch 63.

As soon as the shaft 11 and the surrounding sleeve 12 begin rotation in the opposite or reverse direction, the layshaft 25 also rotates in the opposite direction so that the cam 60 tends to drag the abutment element 62 in the direction prohibited by the one-way clutch 63. The abutment element 62 is therefore locked up by the clutch 63 with the result that the teeth 64 slide on the abutment element teeth 71 shifting the cam 60 axially to the left in FIG. 1, with the result that the pin 73 moves the plunger 54 against the force of the spring 56 sufficiently far to carry the shoulder 55 from beneath the latch wedges 50. This disables the one-way clutches embodied in the assembly 10 by releasing the latching effect of the wedges 50 and allowing the abutment members 45, 46 to shift freely and impose no clamping forces on the plates 41, 42 when the latter are urged toward the abutment members 45, 46 by the nut members 43, 42.

It can thus be seen that a simple and effective mechanism for disabling the clutch assembly 10 has been provided which operates automatically as soon as reverse drive begins and which reestablishes the clutch assembly for normal operation whenever direct or forward drive is resumed. It will also be noted that the control is completely mechanical so as to be highly reliable in operation and economical to manufacture and service.

I claim as my invention:

1. A control for a pair of rotatably mounted parts arranged for rotation in forward and reverse directions comprising, in combination, a shaft, a first one-way clutch having one driven element rotatably coupled to one of said parts and a second driven element coupled through said shaft to the other of said parts so as to positively limit rotational speed variations between said parts by clutching said elements, and thus said parts, together at a predetermined rotational speed variation, said clutch including a movable member positioned to resist the clutch actuating force developed in said clutch so as to permit operation of said clutch, a latch holding said member in position, a helical cam having an axis coupled for rotation with said shaft and being axially slidable, a rotatably mounted abutment disposed against said cam, a second one-way clutch anchoring said abutment against rotation with said cam when said parts rotate in reverse direction so as to drive said cam axially, and means for releasing said latch upon said axial movement of the cam so as to disable said first clutch.

2. A control for a pair of rotatably mounted parts arranged for rotation in forward and reverse directions comprising, in combination, a first one-way clutch having one driven element rotatably coupled to one of said parts and a second driven element coupled through a shaft to the other of said parts so as to positively limit rotational speed variations between said parts by clutching said elements, and thus said parts, together at a predetermined rotational speed variation, said clutch including a movable member positioned to resist the clutch actuating force developed in said clutch so as to permit operation of said clutch, a latch holding said member in position, a cam splined on said shaft and provided with a plurality of annularly disposed teeth having similarly alined, substantially helical cam faces, an annular abutment member rotatably mounted on said shaft and having complimentarily formed teeth interfitted with said cam teeth, a one-way clutch anchoring said abutment member against rotation with said cam when said parts rotate in reverse direction so that said teeth drive said cam axially, and means for releasing said latch upon said axial movement of the cam so as to disable said first clutch.

3. A control for a pair of rotatably mounted parts arranged for rotation in forward and reverse directions comprising, in combination, a journalled shaft carrying a housing member journalled thereon, a set of annular friction plates adjacent said housing member and being alternately secured relative to the shaft and housing member, an annular abutment slidably disposed on said shaft adjacent said housing member and defining a surface adjacent said friction plates, a nut member disposed adjacent said set of plates so as to sandwich the plates between said abutment surface and said nut member, one of said parts being drivingly coupled to said shaft and the other of said parts being drivingly coupled to said housing member so as to rotate the member at a speed level different from the speed of the shaft, means establishing a frictional drag between said shaft and said nut member so that rotation of the shaft tends to rotate the nut member, means defining a helical threaded interengagement between said housing and the nut member tending to urge the nut member away from the adjacent friction plates when the speed of said housing is on one side of said speed level, a latch holding said abutment in position to grip said plates between the abutment and said nut member, a helical cam coupled for rotation with said shaft and being axially slidable, a rotatably mounted abutment disposed against said cam, a one-way clutch anchoring said rotatably mounted abutment against rotation with said cam when said parts rotate in said reverse direction so as to drive said cam axially, and means for releasing said latch upon said axial movement of the cam.

4. A control for a pair of rotatably mounted parts arranged for rotation in forward and reverse directions comprising, in combination, a journalled shaft carrying a housing member journalled thereon, a set of annular friction plates adjacent said housing member and being alternately secured relative to the shaft and housing member, an annular abutment slidably disposed on said shaft adjacent said housing member and defining a surface adjacent said friction plates, a nut member disposed adjacent said set of plates so as to sandwich the plates between said abutment surface and said nut member, one of said parts being drivingly coupled to said shaft and the other of said parts being drivingly coupled to said housing member so as to rotate the member at a speed level different from the speed of the shaft, means establishing a frictional drag between said shaft and said nut member so that rotation of the shaft tends to rotate the nut member, means defining a helical threaded interengagement between said housing and the nut member tending to urge the nut member away from the adjacent friction plates when the speed of said housing is on one side of said speed level, a latch holding said member in position, a cam splined on said shaft and provided with a plurality of annularly disposed teeth having similarly alined, substantially helical cam faces, an annular abutment member rotatably mounted on said shaft and having complimentarily formed teeth interfitted with said cam teeth, a one-way clutch anchoring said abutment member against rotation with said cam when said parts rotate in reverse direction so that said teeth drive said cam axially, and means for releasing said latch upon said axial movement of the cam.

5. A control for a pair of rotatably mounted parts arranged for rotation in forward and reverse directions comprising, in combination, a journalled shaft carrying a housing member journalled thereon, a set of annular friction plates adjacent said housing member and being alternately secured relative to the shaft and housing member, an annular abutment slidably disposed on said shaft adjacent said housing member and defining a surface adjacent said friction plates, a nut member disposed adjacent said set of plates so as to sandwich the plates between said abutment surface and said nut member, one of said parts being drivingly coupled to said shaft and the other of said parts being drivingly coupled to said housing member so as to rotate the member at a speed level different from the speed of the shaft, means establishing a frictional drag between said shaft and said nut member so that rotation of the shaft tends to rotate the nut member, means defining a helical threaded interengagement between said housing and the nut member tending to urge the nut member away from the adjacent friction plates when the speed of said housing is on one side of said speed level, a latching wedge projecting from said shaft for holding said abutment in position to grip said plates between the abutment and said nut member, a helical cam coupled for rotation with said shaft and being axially slidable, a rotatably mounted abutment disposed against said cam, a one-way clutch anchoring said rotatably mounted abutment against rotation with said cam when said parts rotate in reverse direction so as to drive said cam axially, and a plunger slidably fitted in said shaft and coupled to said cam for dropping said wedge into said shaft and thus disabling said abutment upon said axial movement of the cam.

References Cited in the file of this patent

UNITED STATES PATENTS

| 2,799,375 | Forster | July 16, 1957 |
| 2,951,570 | Antrim et al. | Sept. 6, 1960 |

FOREIGN PATENTS

| 690,666 | Great Britain | Apr. 22, 1953 |
| 917,233 | Germany | Aug. 26, 1954 |